(12) United States Patent
Alrabady et al.

(10) Patent No.: US 6,829,357 B1
(45) Date of Patent: Dec. 7, 2004

(54) COMMUNICATION SYSTEM HAVING A TRANSMITTER AND A RECEIVER THAT ENGAGE IN REDUCED SIZE ENCRYPTED DATA COMMUNICATION

(75) Inventors: Ansaf Ibrahem Alrabady, Livonia, MI (US); David Leonard Juzswik, Milford, MI (US)

(73) Assignee: TRW Inc., Lyndhurst, OH (US)

( * ) Notice: Subject to any disclaimer, the term of this patent is extended or adjusted under 35 U.S.C. 154(b) by 0 days.

(21) Appl. No.: 09/460,061

(22) Filed: Dec. 14, 1999

(51) Int. Cl.[7] .................................................. H04L 9/00
(52) U.S. Cl. ....................................... 380/262; 380/260
(58) Field of Search ................................. 380/262, 260

(56) References Cited

U.S. PATENT DOCUMENTS

| | | | |
|---|---|---|---|
| 5,517,187 A | 5/1996 | Bruwer et al. | 340/825.3 |
| 5,675,653 A | 10/1997 | Nelson, Jr. | 380/28 |
| 5,687,238 A | 11/1997 | Shimada | 380/42 |
| 5,733,047 A | 3/1998 | Furuta et al. | 384/43 |
| 5,774,065 A | 6/1998 | Mabuchi et al. | 340/825.72 |
| 6,304,969 B1 * | 10/2001 | Wasserman et al. | 713/172 |
| 6,633,980 B1 * | 10/2003 | Johnson | 713/168 |

OTHER PUBLICATIONS

Schneier, Bruce, Applied Cryptography, 1996, John Wiley & Sons, Inc., 2nd ed., pp. 206–207 and 209.*

* cited by examiner

*Primary Examiner*—Douglas Meislahn
(74) *Attorney, Agent, or Firm*—Tarolli, Sundheim, Covell & Tummino L.L.P.

(57) ABSTRACT

A communication system (10) has a portion (28) of a transmitter controller (14) that provides a message package. An encryption portion (36) of the controller (14) encrypts a first fraction of the message package (e.g., a first portion of the message package and a first part of a second portion of the message package) using a second fraction of the message package (e.g., a second part of the second portion of the message package) as an encryption key. Transmitter components (32 and 34) output a signal (18) that conveys the encrypted first fraction of the message package. Receiver components (56 and 58) receive the signal (18). A decryption portion (60) of a receiver/controller unit (16) decrypts the signal using a decryption key, and reassembles the message package using the decryption key as the second fraction of the message package. Preferably, the communication system (10) is a remote convenience system for remotely controlling a convenience function.

28 Claims, 3 Drawing Sheets

COMMUNICATION SYSTEM HAVING A TRANSMITTER AND A RECEIVER THAT ENGAGE IN REDUCED SIZE ENCRYPTED DATA COMMUNICATION

FIELD OF THE INVENTION

The present invention relates to communication systems that utilize encrypted data communication, and is particularly directed to size reduction for encrypted data communication signals of a remote convenience system.

BACKGROUND OF THE INVENTION

Communication systems that engage in transmission of encrypted data (e.g., information) are known in the art. One example of a communication system that utilizes data encryption is a remote convenience system, which permits remote control of certain functions. Within the remote convenience system, data that conveys security code(s), command(s), and the like is encrypted for transmission via signal. Only an authorized receiver decrypts and responds to the signal. Also, the encryption prevents unauthorized remote control of the certain remote convenience functions.

One example type of a remote convenience system is for remotely controlling vehicle functions. Other example types of remote convenience systems include garage door opener systems and entry light activation systems. Focusing on the remote convenience vehicle systems, remotely controlled vehicle functions include locking and unlocking of one or more vehicle doors. A remote convenience system that permits remote locking and unlocking is commonly referred to as a remote keyless entry system.

Known remote convenience vehicle systems include a receiver/controller unit mounted in an associated vehicle and a portable hand-held transmitter unit located remote from the receiver/controller unit. The transmitter unit is provided with one or more manually actuatable switches. Each switch is associated with a vehicle function to be performed. The transmitter unit includes circuitry that responds to the actuation of one of the switches to provide a message package. The message package includes a remote function command, a security code, and a sequence counter. The message package is transmitted to the receiver in the form of a digital signal.

In order to ensure that the contents of the message package cannot be understood by any receiver other than the intended authorized receiver, the digital bits of the signal are partially or completely encrypted by the transmitter. In order for the receiver to act upon the requested function, the signal is decrypted, a security code compared, and the like. As an extra level of security, the encryption methodology for the communication is changed routinely. Specifically, the transmitter and the receiver utilize a sequence counter arrangement. With each transmission from the transmitter, the sequence counter is adjusted. Upon receipt at the receiver, adjustment is made to the sequence counter value, accordingly. Thus, the receiver utilizes the sequence counter value to recognize a transmitted signal from the authorized transmitter.

As the sophistication of the remote convenience vehicle systems has increased, so has the number of bits that are typically transmitted via the signal. It is to be appreciated that increases in the number of transmitted data bits results in an increase in the possibility of corruption of the data.

SUMMARY OF THE INVENTION

In accordance with one aspect, the present invention provides a transmitter. The transmitter includes means for providing a message package. Means encrypts a first fraction of the message package using a second fraction of the message package as an encryption key. Means outputs a signal that conveys the encrypted first fraction of the message package.

In accordance with another aspect, the present invention provides a receiver that includes means for receiving an encrypted signal. Means decrypts the signal using a decryption key. Means assembles a message package using the decryption key as part of the message package.

In accordance with another aspect, the present invention provides a communication system that includes means for providing a message package. Means encrypts a first fraction of the message package using a second fraction of the message package as an encryption key. Means outputs a signal that conveys the encrypted first fraction of the message package. Means receives the signal. Means decrypts the signal using a decryption key. Means reassembles the message package using the decryption key as the second fraction of the message package.

In accordance with yet another aspect, the present invention provides a remote convenience system for remotely controlling a convenience function. The system includes portable transmitter means for outputting a signal containing remote control message information. Receiver/controller means receives the signal and controls performance of a function in accordance with the remote control message. The remote control message includes first and second fractions. The transmitter means includes encryption means for encrypting the first fraction of the remote control message using a second fraction of the remote control message as an encryption key.

In accordance with still another aspect, the present invention provides a remote convenience system for remotely controlling a convenience function. The system includes portable transmitter means for outputting a signal containing remote control message information. Receiver/controller means receives the signal and controls performance of a function in accordance with the remote control message. The remote control message includes first and second information portions. The signal contains the first portion and a first part of the second portion that are encrypted. The receiver/controller means includes decryption means for decrypting the first portion and the first part of the second portion using a decryption key. The receiver/controller means includes means for assembling a decrypted message using the decryption key as the second part of the second portion.

BRIEF DESCRIPTION OF THE DRAWINGS

The foregoing and other features and advantages of the present invention will become apparent to those skilled in the art to which the present invention relates upon reading the following description with reference to the accompanying drawings, wherein.

DESCRIPTION OF PREFERRED EMBODIMENT

Figure 1:
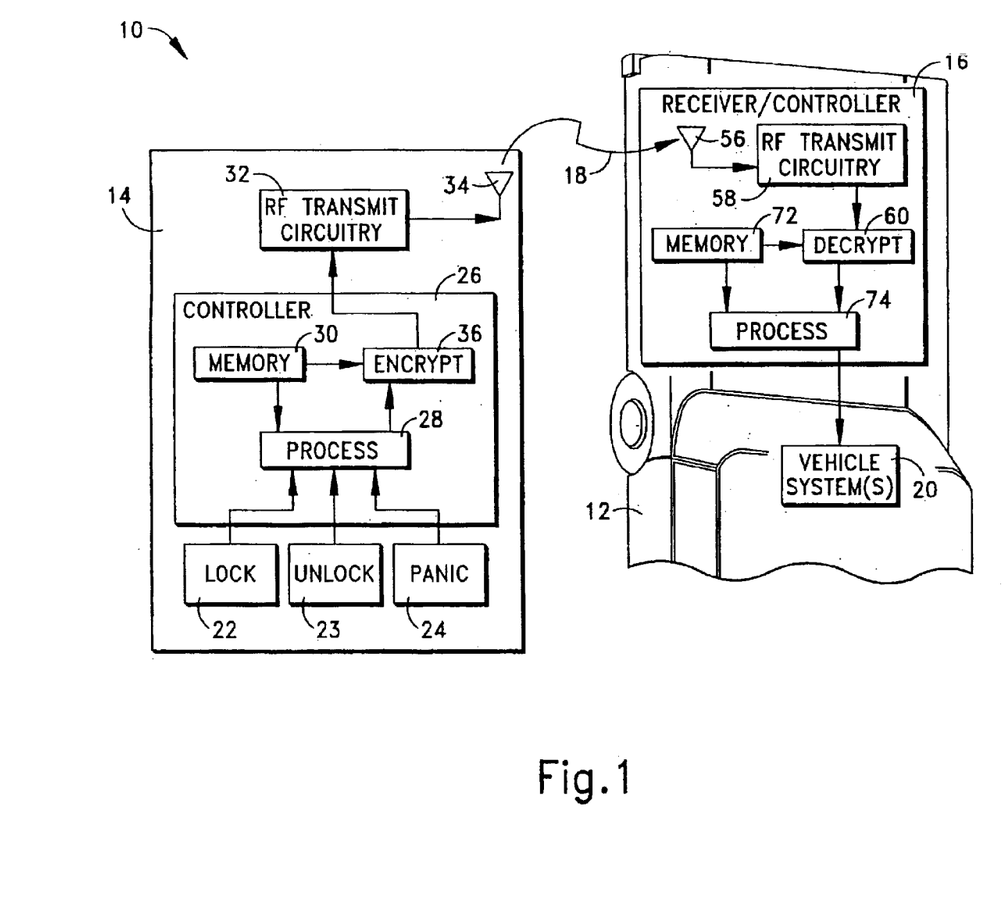
FIG. 1 is a schematic illustration of an example of a communication system in accordance with the present invention and associated with a vehicle.

A communication system 10 in accordance with the present invention is schematically shown in FIG. 1. Preferably, the communication system 10 is a remote convenience system for remotely controlling a convenience function. Thus, hereinafter the communication system 10 is referred to as the remote convenience system 10. In the illustrated example of FIG. 1, the remote convenience system 10 is for remote control of convenience functions at an associated vehicle 12.

The system 10 includes a portable, hand-held transmitter unit 14, and an associated receiver/controller unit 16 that is mounted in the vehicle 12. The transmitter unit 14 is operable to communicate, via a signal 18, with the receiver/controller unit 16 to achieve remote control performance of at least one convenience function (e.g., unlock doors) at a vehicle system 20 (e.g., vehicle door lock actuators) of the vehicle 12. The transmitter unit 14 is operable by an operator (not shown) when the operator desires performance of the requested remote convenience function at the vehicle 12.

The transmitter unit 14 includes at least one manually actuatable pushbutton switch (e.g., 22). In the example shown in FIG. 1, there are three pushbutton switches 22–24. A first pushbutton switch 22 and a second pushbutton switch 23 are associated with door lock and unlock functions, respectively. A third pushbutton switch 24 is associated with a vehicle alarm or "panic" function. It is to be appreciated that the system could be configured to control different remote convenience functions, and that the transmitter unit structure (e.g., the number, type, and location of the pushbutton switches on the transmitter unit) would be accordingly different.

Each actuation or predefined series of actuations of one of the pushbutton switches (e.g., 22) of the transmitter unit 14 is a request to perform a corresponding predefined remote convenience function. For example, actuating the first pushbutton switch 22 is a request to lock the doors of the vehicle 12. The pushbutton switches 22–24 are operatively connected to a controller 26. In response to pushbutton actuation, a process portion 28 of the controller 26 generates/assembles a message package containing information that is to be transmitted. Preferably, data strings that represent the information are retrieved from a memory 30 of the controller 26.

The controller 26 is operatively connected to RF transmit circuitry 32. In turn, the RF transmit circuitry 32 is operatively connected to a broadcast transmission antenna 34. Upon provision of message information from the controller 26 to the RF transmit circuitry 32, the antenna 34 is energized to emit the signal 18. Preferably, the transmitted signal 18 is a pulse-width-modulated (PWM) signal that has a radio frequency (RF) carrier frequency. It is to be appreciated that other signal types (e.g., frequency modulation, frequency shift key or the like) can be used without deviating from the present invention.

The message package information that is generated/assembled within the controller 26 includes a start/wakeup instruction, a security code, and at least one command that represents the remote function request. At least some of the information that is to be transmitted to the receiver/controller unit 16 is encrypted by an encryption portion 36 of the controller 26 in order to prevent unauthorized interception and use. The portions of the message information that are encrypted preferably include the security code and the command(s).

To further increase security, a sequence counter is also part of the message information. The sequence counter is changed (e.g., advanced) for each communication interaction between the transmitter unit 14 and the receiver/controller unit 16. Encryption is also used to secure the sequence counter during transmission.

The sum of all the information that is to be conveyed from the transmitter unit 14 to the receiver/controller unit 16 results in a relatively large volume of data bits. Thus, in accordance with the present invention, an encrypted portion of the transmitted signal 18 is provided with a reduced number of data bits compared to the overall number of bits of the information.

Figure 2:
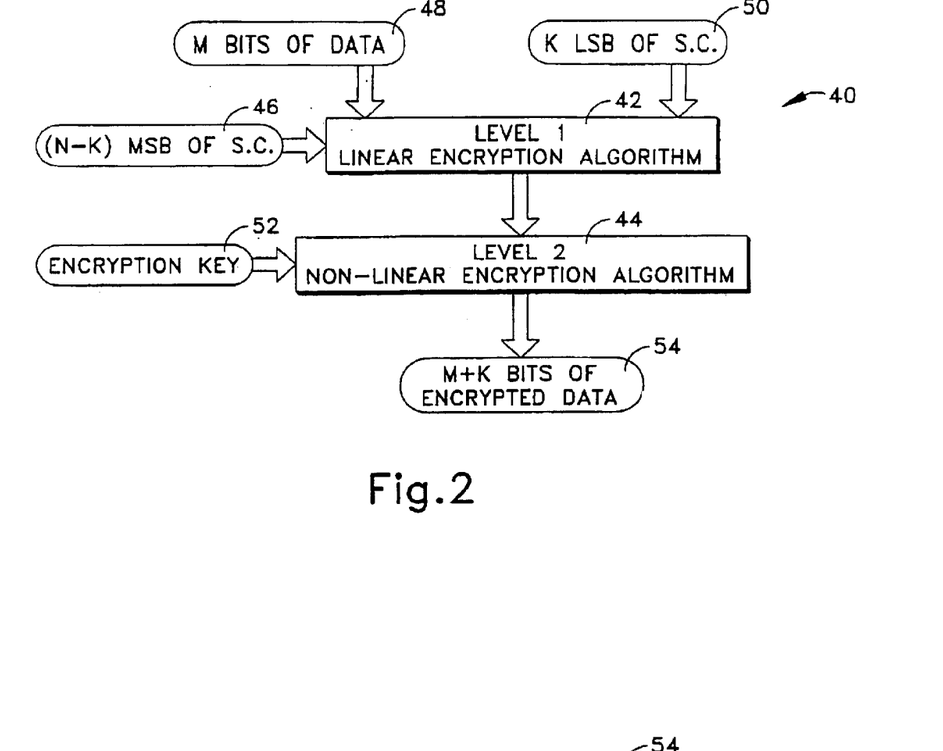
FIG. 2 is a diagram showing an encryption process in accordance with the present invention.

FIG. 2 illustrates an example of an encryption process 40 performed by the encryption portion 36 (FIG. 1) of the controller 26, in accordance with the present invention. In the preferred embodiment, the encryption process 40 (FIG. 2) has two encryption stages 42 and 44 (i.e., level 1 and level 2). Moreover, a part 46 of the sequence counter is used as an encryption key for one of the encryption stages (e.g., 42).

M bits of data 48 (e.g., the security code, command(s)) and K least significant bits 50 of the sequence counter are encrypted via a linear encryption algorithm of the first encryption stage 42. The sequence counter has N total bits, and K (i.e., the least significant bits) is less than N. Preferably, the most significant bits 46 (i.e., N–K) of the sequence counter are used as the encryption key within the first stage 42 of the encryption process 40. Thus, a first fraction of the message package (i.e., the M bits of data and the K least significant bits of the sequence counter) is encrypted using a second fraction of the message package (i.e., the N–K most significant bits of the sequence counter). The output of the first stage 42 of the encryption process 40 is a bit string that contains M+K bits.

As an example for the first stage 42 of the encryption process 40, consider data string sizes where M=32 bits, N=16 bits, and K=8 bits. Further, assume that the 32-bit data 48 that is to be encrypted is equal to the value 87654321 and that the sequence counter at this instance is equal to the value 1234. The most significant bits 46 (i.e., N–K) of the sequence counter represent the value 12 and the least significant bits 50 (i.e., K) of the sequence counter represent the value 34.

An example of a simple linear encryption algorithm that occurs at the first stage 42 adds the 32 data bits (i.e., data 48) to the eight (8) most significant bits of the sequence counter (i.e., the encryption key 46 for the first stage 42), and then concatenates the eight (8) least significant bits 50 of the sequence counter to the addition sum value. Thus, the algorithm first provides 87654321+12=87654333. The addition sum value (i.e., 87654333) is concatenated with the value 34 to provide a value of 8765433334. The result of the concatenation (i.e., 8765433334) is a forty (40) bit number (i.e., 32 bits+8 bits) and is the output of the first stage 42 of the encryption process 40. It is to be noted that the number of bits (i.e., 40 bits) output from the first stage 42 is less than the total bits for the data (i.e., 32 bits) and the sequence counter (i.e., 16 bits).

The forty (40) bit value output from the first stage 42 is then provided to the second stage 44 for non-linear encryption. An encryption key 52 is used for the non-linear encryption of the second stage 44. The non-linear encryption algorithm is not part of the present invention and is not described in detail herein. Any of several known non-linear encryption techniques may be used. The output 54 of the second stage 44 is a forty (40) bit number (i.e., same size data string as output from the first stage 42). Thus, it is to be noted that the number of bits (i.e., 40 bits) in the output 54 of the encryption process 40 is less than the total bits for the data (i.e., 32 bits) and the sequence counter (i.e., 16 bits).

The encrypted data 54 (e.g., the first fraction of the message package) and any non-encrypted data are provided to the RF transmit circuitry 32 (FIG. 1). The RF transmit circuitry 32 then provides an appropriate electrical signal that conveys the data to the antenna 34. In response to the stimulus, the antenna 34 broadcasts the signal 18, which is intended to be received by the receiver/controller unit 16 at the vehicle 12. It is to be noted that the signal 18 does not convey bits representing the most significant bits 46 of the sequence counter. Thus, the number of bits that is conveyed via the signal 18 is less than the number of bits that would be conveyed if all of the bits of the sequence counter are conveyed.

Figure 3:
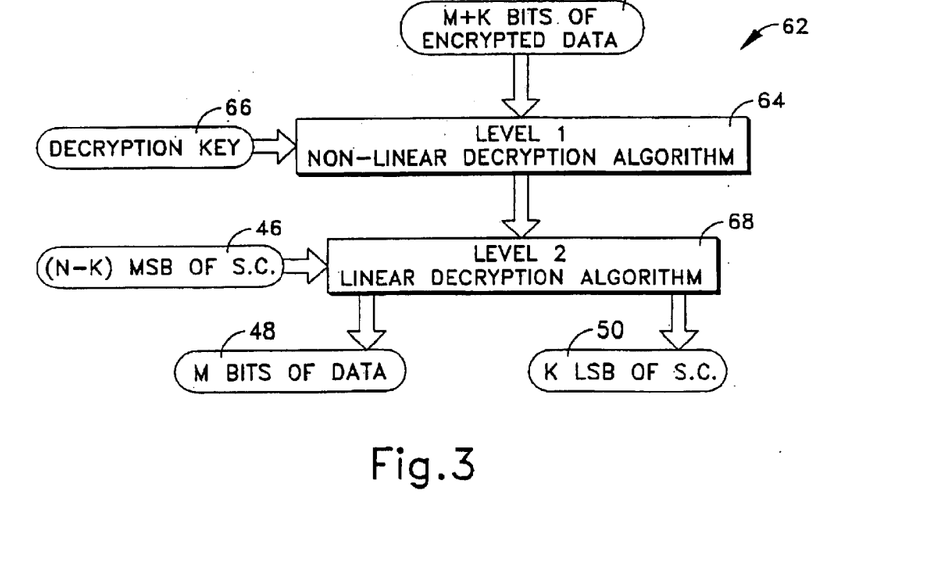
FIG. 3 is a diagram showing a decryption process in accordance with the present invention.

At the receiver/controller unit 16, an antenna 56 is operatively connected to RF receive circuitry 58. In turn, the RF receive circuitry 58 is operatively connected to a decryption portion 60 of the receiver/controller unit 16. The contents of the signal 18 are conveyed to the decryption portion 60, and the decrypt portion performs a two-stage decryption process 62 (FIG. 3) upon the encrypted data. Specifically, the M+K bits of encrypted data 54 (i.e., the first fraction of the message package) are provided to a first decryption stage 64 of the decryption process 62.

The first stage 64 performs a non-linear decryption algorithm that uses a decryption key 66. A reversal of the encryption provided in the second stage 44 (FIG. 2) of the encryption process 40 is accomplished at the first stage 64 (FIG. 3) of the decryption process 62. Here also, the non-linear decryption algorithm is not part of the present invention and is thus not described in detail. However, it is to be understood that M+K bits of data, which are now merely linear encrypted, are output from the first stage 64 and are input to a second decryption stage 68 of the decryption process 62.

At the second stage 68, the most significant bits 46 of the sequence counter are provided from a memory 72 (FIG. 1) and are used as a decryption key. It is to be understood that since the transmitter unit 14 and the receiver/controller unit 16 are both progressing through the sequence counter during normal operation, the receiver/controller unit will already have in its possession the most significant bits of the sequence counter. In other words, the values of the sequence counter at the transmitter unit 14 and the receiver/controller unit 16 are normally the same or very close. Moreover, the value of the least significant bits of the sequence counter at the transmitter unit 14 can vary from the value of the least significant bits at the receiver/controller unit 16 without effect to the most significant bits 46 (FIG. 3) that are used as the decryption key for the second stage 68 of the decryption process 62.

It is contemplated that if the sequence counter value at the transmitter unit 14 (FIG. 1) and the sequence counter value at the receiver/controller unit 16 differ significantly enough to effect the most significant bits of the sequence counter, an algorithm or technique may be utilized to resolve such an out-of-sync condition. Such algorithms and techniques are not part of the present invention and are not described herein.

Turning again to the decryption process 62 (FIG. 3), the operation of the algorithm of the second stage 68 (i.e., the linear decryption portion) provides the M bits of data 48 and the K least significant bits 50 of the sequence counter in non-encrypted form. In order to complete the process of providing the entire message package, the most significant bits 46 of the sequence counter are appended with the least significant bits 50 of the sequence counter to provide the entire sequence counter value. In other words, the first and second fractions of the message package are reunited. A process portion 74 (FIG. 1) of the receiver/controller unit 16 can then perform appropriate process steps utilizing the data (e.g., the commands) and the sequence counter.

Figure 4:
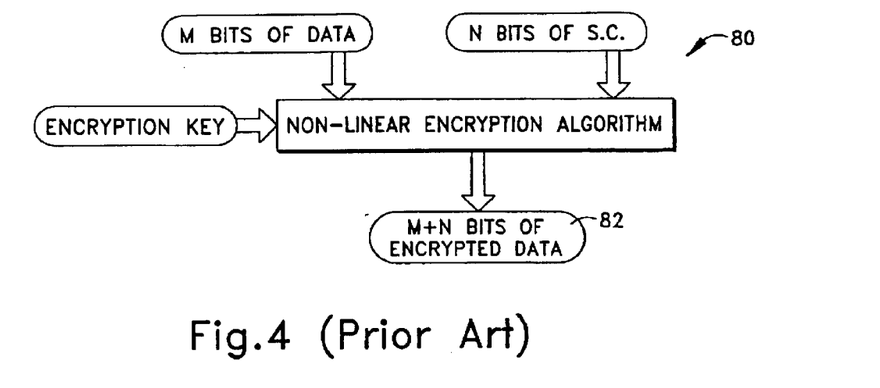
FIG. 4 is a diagram of a known encryption process.
Figure 5:
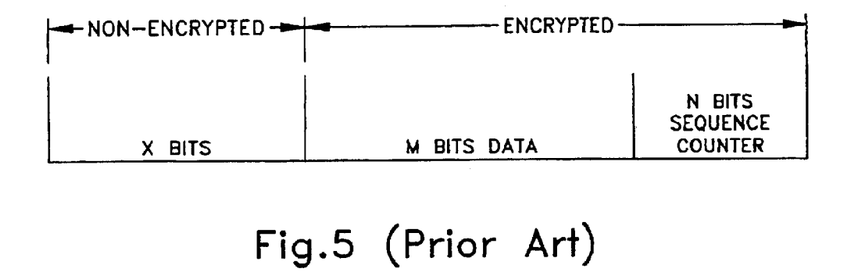
FIG. 5 is a diagram illustrating relative size of a message transmitted via a system that utilizes the known encryption process of FIG. 4.
Figure 6:
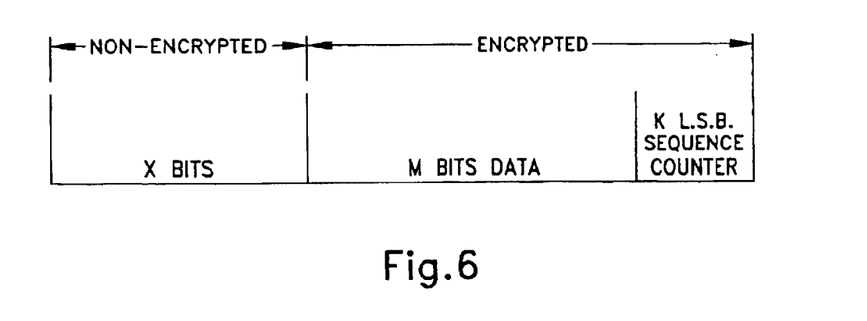
FIG. 6 is a diagram showing the relative size of a message transmitted utilizing the present invention.

In order to appreciate the advantage of the present invention, attention is directed to FIG. 4, which shows a conventional process 80 of encrypting M bits of data and N bits of a sequence counter (N being the total bits of the sequence counter). The output 82 of the encryption process 80 has M+N encrypted bits. The relative size of the data string for the conventional process 80 is represented in FIG. 5. In distinction, the relative size of the data string that is produced in accordance with the present invention is shown in FIG. 6. Again, it is to be noted that the number of bits corresponding to the K least significant bits of the sequence counter is less than the total bits M of the sequence counter (i.e., K<M).

From the above description of the invention, those skilled in the art will perceive improvements, changes and modifications. Such improvements, changes and modifications within the skill of the art are intended to be covered by the appended claims.

Having described the invention, the following is claimed:

1. A transmitter comprising:

means for providing a message package;

means for encrypting a first fraction of the message package using a second fraction of the message package as an encryption key; and means for outputting a signal that conveys the encrypted first fraction of the message package, wherein said means for providing a message package includes means for providing the message package to contain first and second portions, and to have a predefined number of bits, the first fraction of the message package includes the first portion and a first part of the second portion, the first portion and the first part of the second portion containing fewer bits than the predefined number, the second fraction including a second part of the second portion, said means for encrypting includes means for encrypting the first portion and the first part of the second portion using the second part of the second portion as the encryption key, and said means for outputting includes means for outputting the signal to convey the encrypted first portion and the encrypted first part of the second portion, wherein said means for providing a message package includes means for providing the first portion of the message package to include a command and for providing the second portion of the message package to include a sequence counter, and wherein the first part of the second portion of the message package includes least significant bits of the sequence counter and the second part of the second portion of the message package includes most significant bits of the sequence counter, said means for encrypting the first portion and the first part of the second portion includes means for using the most significant bits of the sequence counter as the encryption key.

2. A receiver comprising:

means for receiving an encrypted signal;

means for decrypting the signal using a decryption key; and means for assembling a message package using the decryption key as part of the message package, wherein said means for receiving includes means for receiving the signal to convey an encrypted first portion of the message package and an encrypted first part of a second portion the message package, the first portion and the first part of the second portion contain a predefined number of bits, said means for assembling includes means for assembling the second portion of the message package using the decryption key as a second part of the second portion of the message package, the assembled message package contains more bits than the predefined number, wherein the first portion of the message package includes a command and the second portion of the message package includes a sequence counter, said means for decrypting includes means for decrypting using a value representing part of the sequence counter as the decryption key, and wherein the first part of the second portion of the message package includes least significant bits of the sequence counter and the second part of the second portion includes most significant bits of the sequence counter, said means for decrypting using a value representing part of the sequence counter includes means for using a value representing the most significant bits of the sequence counter as the decryption key.

3. A receiver as set forth in claim 2, including a memory for storing the sequence counter, an updated sequence counter is stored in the memory after each received message package, said means for decrypting includes means for accessing the memory to retrieve the value representing the part of the sequence counter.

4. A communication system comprising:

means for providing a message package;

means for encrypting a first fraction of the message package using a second fraction of the message package as an encryption key;

means for outputting a signal that conveys the encrypted first fraction of the message package;

means for receiving the signal;

means for decrypting the signal using a decryption key; and means for reassembling the message package using the decryption key as the second fraction of the message package, wherein said means for providing a message package includes means for providing the message package to contain first and second portions, and to have a predefined number of bits, the first fraction of the message package includes the first portion and a first part of the second portion, the first portion and the first part of the second portion containing fewer bits than the predefined number, the second fraction including a second part of the second portion, said means for encrypting includes means for encrypting the first portion and the first part of the second portion using the second part of the second portion as the encryption key, said means for outputting includes means for outputting the signal to convey the encrypted first portion and the encrypted first part of the second portion, and said means for reassembling includes means for assembling the second portion of the message package using the decryption key as the second part of the second portion of the message package, wherein said means for providing the message package to contain first and second portions includes means for providing the first portion of the message package to includes a command and for providing the second portion of the message package to include a sequence counter, and wherein the first part of the second portion includes least significant bits of the sequence counter and the second part of the second portion includes most significant bits of the sequence counter, said means for encrypting the first portion and the first part of the second portion includes means for using the most significant bits of the sequence counter as the encryption key.

5. A communication system comprising:

means for providing a message package;

means for encrypting a first fraction of the message package using a second fraction of the message package as an encryption key;

means for outputting a signal that conveys the encrypted first fraction of the message package;

means for receiving the signal;

means for decrypting the signal using a decryption key; and means for reassembling the message package using the decryption key as the second fraction of the message package, wherein said means for providing a message package includes means for providing the message package to contain first and second portions, and to have a predefined number of bits, the first fraction of the message package includes the first portion and a first part of the second portion, the first portion and the first part of the second portion containing fewer bits than the predefined number, the second fraction including a second part of the second portion, said means for encrypting includes means for encrypting the first portion and the first part of the second portion using the second part of the second portion as the encryption key, said means for outputting includes means for outputting the signal to convey the encrypted first portion and the encrypted first part of the second portion, and said means for reassembling includes means for assembling the second portion of the message package using the decryption key as the second part of the second portion of the message package, wherein said means for providing the message package to contain first and second portions includes means for providing the first portion of the message package to includes a command and for providing the second portion of the message package to include a sequence counter, and wherein the first part of the second portion includes least significant bits of the sequence counter and the second part of the second portion includes most significant bits of the sequence counter, said means for decrypting using a value representing part of the sequence counter includes means for using a value representing the most significant bits of the sequence counter as the decryption key.

6. A system as set forth in claim 5, including a memory for storing the sequence counter, an updated sequence counter is stored in the memory after each received message package, said means for decrypting includes means for accessing the memory to retrieve the value representing the part of the sequence counter.

7. A system as set forth in claim 5, wherein said means for assembling the second portion of the message package includes means for assembling the sequence counter with the most significant bits and the least significant bits.

8. A remote convenience system for remotely controlling a convenience function, said system comprising:

portable transmitter means for outputting a signal containing remote control message information; and receiver/controller means for receiving the signal and controlling performance of a function in accordance with a command provided in the remote control message information;

wherein the remote control message information includes first and second fractions, said transmitter means includes encryption means for encrypting the first fraction of the remote control message information using a second fraction of the remote control message information as an encryption key, wherein the remote control message information includes first and second information portions, the first fraction of the remote control message information includes first information portion and a first part of the second information portion of the remote control message information, the second fraction of the remote control message information includes a second part of the second information portion of the remote control message information, said encryption means including means for encrypting the first information portion and the first part of the second information portion using the second part of the second information portion as the encryption key, wherein the first information portion of the remote control message information includes command and the second information portion of the message package includes a sequence counter, and wherein the first part of the second information portion includes least significant bits of the sequence counter and the second part of the second information portion includes most significant bits of the sequence counter, said means for encrypting the first information portion and the first part of the second information portion includes means for using the most significant bits of the sequence counter as the encryption key.

9. A transmitter comprising:

means for providing a message package that includes first and second message portions, the second message portion including least significant bits and most significant bits;

means for forming an encrypted message by using a first one of the least significant bits and the most significant bits of the second message portion as an encryption key for encrypting the first message portion and a second one of the least significant bits and the most significant bits of the second message portion; and means for transmitting a signal that includes encrypted message.

10. The transmitter of claim 9 wherein the most significant bits of the second message portion are used as the encryption key for encrypting the first message portion and the least significant bits of the second message portion.

11. The transmitter of claim 9 wherein the message package includes a first number of bits and the encrypted message includes a second number of bits that is less than the first number of bits by an amount equal to a number of bits used as the encryption key.

12. The transmitter of claim 9 wherein the first message portion includes an identification code associated with the transmitter.

13. The transmitter of claim 9 wherein the first message portion includes an identification code and a command and wherein the second message portion is a sequence counter, the most significant bits of the sequence counter being used as the encryption key for encrypting the identification code, the command, and the least significant bits of the sequence counter so that the encrypted message is smaller in size than the message package by a number of bits used as the encryption key.

14. The transmitter of claim 9 wherein the means for transmitting the signal that includes encrypted message further includes means for transmitting a radio frequency signal.

15. A receiver comprising:

means for receiving a signal that includes an encrypted message, the encrypted message including a first message portion and a first part of a second message portion, the first part of the second message portion including a first one of least significant bits of the second message portion and most significant bits of the second message portion;

means for decrypting the encrypted message using a decryption key, the decryption key being a second one of the least significant bits of the second message portion and the most significant bits of the second message portion; and means for assembling a message package that includes first message portion and both the least significant bits and the most significant bits of the second message portion.

16. The receiver of claim 15 wherein the most significant bits of the second message portion are used as the decryption key for decrypting the encrypted message.

17. The receiver of claim 15 wherein the encrypted message includes a first number of bits and the message package that is assembled includes a second number of bits that is greater than the first number of bits by a number of bits used as the decryption key.

18. The receiver of claim 15 wherein the first message portion includes an identification code associated with a transmitter from which the signal originated.

19. The receiver of claim 15 wherein the first message portion includes an identification code and a command and wherein the second message portion is a sequence counter, the most significant bits of the sequence counter being used as the decryption key for decrypting the identification code, the command, and the least significant bits of the sequence counter of the encrypted message so that the message package that is assembled is larger in size than the encrypted message by a number of bits used as the decryption key.

20. The receiver of claim 19 wherein the means for receiving the signal further includes means for transmitting a radio frequency signal.

21. A communication system comprising:

means for providing a message package that includes a first message portion and a second message portion, the second message portion including least significant bits and most significant bits;

means for forming an encrypted message by using a first one of the least significant bits and the most significant bits of the second message portion as an encryption key to encrypt the first message portion and a second one of the least significant bits and the most significant bits of the second message portion;

means for transmitting a signal that includes encrypted message;

means for receiving the signal that includes encrypted message;

means for decrypting the encrypted message using a decryption key, the decryption key also being the first one of the least significant bits and the most significant bits of the second message portion; and means for assembling the message package that includes first message portion and both the least significant bits and the most significant bits of the second message portion.

22. The system of claim 21 wherein the first one of the least significant bits and the most significant bits of the second message portion is the least significant bits of the second message portion and the second one of the least significant bits and the most significant bits of the second message portion is the most significant bits and wherein the first message portion includes an identification code.

23. The system of claim 21 wherein the first message portion includes an identification code and a command, the second message portion including a sequence counter, the most significant bits of the sequence counter being used as the encryption key for encrypting the identification code, the command, and the least significant bits of the sequence counter.

24. The system of claim 21 wherein the means for transmitting the signal that includes encrypted message further includes means for transmitting a radio frequency signal and wherein the means for receiving the signal further includes means for receiving the radio frequency signal.

25. A remote convenience system for remotely controlling a convenience function, the system comprising:

portable transmitter means for transmitting a signal that includes an encrypted message, the encrypted message including a first message portion and a first part of a second message portion of a message package, a second part of the second message portion of the message package forming an encryption key for encrypting the first message portion and the first part of the second message portion of the message package, the first part of the second message portion including a first one of least significant bits of the second message portion and most significant bits of the second message portion and the second part of the second message portion including a second one of the least significant bits and the most significant bits of the second message portion;

receiver/controller means for receiving the signal that includes the encrypted message and for decrypting the encrypted message using a decryption key, the decryption key also being the second one of the least significant bits and the most significant bits of the second message portion, the receiver/controller means assembling the message package having the first message portion and both the least significant bits and the most significant bits of the second message portion.

26. The system of claim 25 wherein the system is associated with a vehicle and the receiver/controller means including means for controlling performance of a vehicle function in accordance with the message package that is assembled.

27. The system of claim 25 wherein the second one of the least significant bits and the most significant bits of the second message portion is the most significant bits of the second message portion.

28. The system of claim 25 wherein the first message portion includes an identification code and a command, the second message portion including a sequence counter, the most significant bits of the sequence counter being used as the encryption key for encrypting the identification code, the command, and the least significant bits of the sequence counter.

* * * * *

UNITED STATES PATENT AND TRADEMARK OFFICE
CERTIFICATE OF CORRECTION

PATENT NO. : 6,829,357 B1  
DATED : December 7, 2004  
INVENTOR(S) : Ansaf Ibrahem Alrabady et al.

It is certified that error appears in the above-identified patent and that said Letters Patent is hereby corrected as shown below:

Column 10,
Line 58, after "claim" change "19" to -- 15 --.

Column 11,
Lines 5 and 6, before "encrypted" insert -- the --.

Signed and Sealed this

Twenty-first Day of June, 2005

JON W. DUDAS
*Director of the United States Patent and Trademark Office*